United States Patent [19]

Kim et al.

[11] Patent Number: 5,311,651
[45] Date of Patent: May 17, 1994

[54] METHOD FOR MANUFACTURING MULTI-LAYER CERAMIC CAPACITOR

[75] Inventors: Yoon Ho Kim; Tae Sung Oh; Chang Bong Lee, all of Seoul, Rep. of Korea

[73] Assignee: Korea Institute of Science and Technology (KIST), Seoul, Rep. of Korea

[21] Appl. No.: 940,586

[22] Filed: Sep. 4, 1992

[30] Foreign Application Priority Data

Sep. 11, 1991 [KR] Rep. of Korea ............... 15865/1991

[51] Int. Cl.[5] .............................................. H01G 4/30
[52] U.S. Cl. .................................. 29/25.42; 361/309; 361/310
[58] Field of Search ............... 29/25.42; 361/306, 308, 361/309, 310, 321

[56] References Cited

U.S. PATENT DOCUMENTS 4,071,880  1/1978  Rutt .
4,584,629  4/1986  Garcia et al. .
4,652,967  3/1987  Sakabe et al. .

Primary Examiner—Carl E. Hall
Attorney, Agent, or Firm—Townsend and Townsend Khourie and Crew

[57] ABSTRACT

A method for manufacturing multi-layer ceramic capacitors wherein the internal electrodes are formed by introducing molten metallic material into the void layers of a ceramic dielectric body. The method comprises of applying and baking paste of silver or platinum/silver on the opposite end surfaces of ceramic dielectric body to form first external electrodes and introducing molten metallic material into void layers through injection openings which are in communication with the void layers and open at side surfaces of the ceramic dielectric body to form internal electrodes. The ceramic dielectric body can be filled with molten metal for relative short time and under low pressure as compared with a prior art ceramic dielectric body having porous penetrable barriers.

4 Claims, 3 Drawing Sheets

METHOD FOR MANUFACTURING MULTI-LAYER CERAMIC CAPACITOR

BACKGROUND OF THE INVENTION

The present invention relates to a method for manufacturing multi-layer a ceramic capacitors wherein the internal electrodes are formed by introducing molten metallic material into the void layers formed in the ceramic dielectric body of the capacitor, and more particularly, to a method for manufacturing a multi-layer ceramic capacitor wherein after applying and baking the paste used for forming the external electrodes at the opposite end surfaces of the ceramic dielectric body, a molten metallic material is introduced into the void layers to form the internal electrodes. The molten material is injected through openings located at the side surfaces of the ceramic dielectric body. Further, these openings are in communication with the void layers in the ceramic dielectric body.

In general, multi-layer ceramic capacitors have been in widespread use because their dielectric constant and electrostatic capacitance are relatively high compared to the other types of capacitors.

FIG. 1 exemplifies a section of a prior-art multi-layer ceramic capacitor in which a noble metal is replaced with cheap base metal in order to reduce the cost associated with the manufacturing of the multi-layer ceramic capacitors.

As illustrated by the drawing, the multi-layer ceramic capacitor has a plurality of internal electrodes 3 formed in void layers 2. The void layers are formed by stacking and sintering a plurality of thin ceramic dielectric sheets, each of which is printed with a carbon powder-based paste. A pair of external electrodes 4 and 4' are each connected to the prescribed internal electrodes 3 at opposite end surfaces of the multi-layer ceramic capacitor where the internal electrodes 3 are exposed to the outside. The term, "void layers," as used herein is intended to mean layers which are free or essentially free of dense ceramic material, and hence, are subject to being filled by molten metallic material to form the internal electrodes.

The multi-layer ceramic capacitor described above is manufactured as follows. First, a paste, which is prepared by mixing ceramic powder, such as carbon, alumina or barium titanate ($BaTiO_3$) powder with organic solvent and resin, is printed on each of the ceramic dielectric sheets where the internal electrodes 2 should be formed. Then, a plurality of ceramic dielectric sheets are stacked, fired at a temperature of 500° C. and kept at that temperature for a length of time sufficient to burn and remove the carbon powder, organic solvent and resin which are printed thereon. Thereafter, the stacked ceramic dielectric sheets are again heated to a temperature of 1100°–1400° C. and kept at this temperature for two hours prior to being cooled down. Thus, void layers 2 are formed in the ceramic dielectric body 1. In addition, crystal grains are formed in the ceramic dielectric body 1, giving it optimum sintering density and electrical properties. Although the void layers 2 prepared by the sintering procedure may vary in thickness due to viscosity of the paste and size of the mesh used in a screen printing procedure, the thickness of the void layers 2 are usually in a range of about 3–10 μm.

Thereafter, molten metallic material is introduced into the void layers 2 of the ceramic dielectric body 1 to form internal electrodes 3. The molten metallic material primarily used for forming the internal electrodes 3 is Pb or an alloy thereof, or Sn or an alloy thereof. Pressure in a bath containing the molten metallic material should be kept at about 3.0 MPa in order to introduce the molten metallic material into, and completely fill, the void layers 2. The molten metallic material is then cooled down.

After the molten metallic material in the void layers 2 is completely cooled, the external electrodes 4 and 4' are applied to each of the end surfaces of the ceramic dielectric body 1 and baked. By this process, the external electrodes are electrically connected to the internal electrodes 3 where they are exposed to the outside. Thus, the prior art manufacturing process of the multi-layer ceramic capacitor is completed.

However, a significant problem exists with the above-mentioned known manufacturing process for multi-layer ceramic capacitor. The problem is associated with the procedure for forming the external electrodes after the molten metallic material for forming internal electrodes is introduced into the void layers.

As the molten material used to form the internal electrodes cools down, it tends to shrink. This shrinkage causes the molten metal to recede from the end surfaces of the capacitor, thereby creating a gap between the end surfaces of the capacitor and the outermost end surfaces. The gap makes it difficult for the metallic paste used to form the external electrodes to be electrically connected to the metal which forms the internal electrodes in the void layers.

Furthermore, in order for the external electrodes to adhere to the ceramic dielectric body, it is necessary to bake the metallic paste used to form the external electrodes at a temperature of 600°–800° C. Since 600°–800° C. is higher than the melting point of the metal components used to form the internal electrodes, it is impossible to prevent the outward leaking of the metal components of the internal electrodes because they are again melted during the baking procedure.

An attempt to solve the leakage problem of the metal components in the void layers is disclosed in the U.S. Pat. No. 4,584,629. In the patent, the ceramic dielectric body is subjected to a sputtering or a plating procedure to form a metallic film at each of the end surfaces thereof before the molten metallic material for forming internal electrodes is introduced into the void layers. This prevents the molten metallic material introduced into the void layers from leaking outwardly and thereby, improves quality of connection between the internal and the external electrodes.

However, the above-mentioned method for forming metallic film requires complicated procedures such as a vapor deposition or a plating procedure. These procedures make it necessary to mask the ceramic dielectric body in order to control the formation of the metallic film only at both end surfaces of the dielectric body, thereby causing the manufacturing process to be cumbersome.

In addition, it is necessary to heat the paste for forming the external electrodes at a temperature higher than 600° C. or above, which is higher than the melting point of the molten metal for internal electrodes. Thus, it is impossible to prevent the molten metallic material used for forming the internal electrodes from leaking outwardly since it will be melted by the high baking temperature.

Also, further attempts to overcome the above problems are disclosed in U.S. Pat. Nos. 4,071,880 and 4,652,967. In the above patents, porous penetrable barriers are applied to both end surfaces of the ceramic dielectric body where the openings which are in communication with the void layers are located. The porous penetrable barriers are comprised of either metal or ceramic. After the porous penetrable barriers are applied, a molten metallic material is introduced into the void layers through the porous penetrable barriers to form the internal electrodes.

If metal porous penetrable barriers are used, they may be used as a part of the external electrodes. On the other hand, if ceramic barriers are used, they must be ground away until the internal electrodes are exposed. After which, the external electrodes are applied to the ground barriers.

However, there are problems associated with the usage of either the ceramic or metal porous barriers. In the case where ceramic porous penetrable barriers are used to form the external electrodes, it is difficult to grind them due to minute size of the ceramic capacitor.

On the other hand, it is substantially more difficult to introduce the molten metallic material into the void layers through the metal porous penetrable barriers since they are significantly less permeable compared to their ceramic counterparts. Consequently, injecting pressure and injecting time of the molten metallic material must be increased in order to sufficiently introduce the molten metal into the void layers if metal barriers are used.

However, increasing the injecting pressure and injecting time of the molten metallic material used to form the internal electrodes causes other problems. Due to the increased pressure and time, the molten metallic material introduced into the void layers also permeates the ceramic dielectric body through defects of surfaces of the void layers so that essential thicknesses of the ceramic dielectric layers between the internal electrodes become small. As a result, internal insulation resistance of the ceramic capacitor is decreased while the potential for shorts of the internal electrodes is increased.

Also, the combination of using metal porous penetrable barriers comprised of silver or platinum/silver as external electrodes, and lead or an alloy presents a problem. Because injection pressure and time of the molten metal must be increased, the silver in the porous barriers is subjected to leaching and removed by the molten lead. As a result, the electrical conductivity of the metal porous penetrable barriers is substantially decreased, thereby causing functions of the metal barriers as external electrodes to be lost.

SUMMARY OF THE INVENTION

The present invention has been made in view of the above-described problems occurring in the prior art methods for manufacturing ceramic capacitors. An object of the invention is to provide a method for manufacturing ceramic capacitors in which injection openings are formed to be in communication with the void layers of a dielectric ceramic body used to produce the internal electrodes so that both the injection pressure and injection time of the subsequent injection process are substantially decreased.

In accordance with one aspect, the present invention provides a method for manufacturing multi-layer ceramic capacitor in which the dielectric body layers is formed by stacking a plurality of dielectric sheets. The void layers with injection openings in which the internal electrodes are to be formed are produced by applying a carbon combustible paste on each of the dielectric sheets prior to being stacked together. The stacked dielectric sheets are then sintered to produce a dielectric body with injection openings at both end surfaces which are in communication with the void layers.

The electrodes of the multi-layer ceramic capacitor are formed in the following manner. The first set of external electrodes are formed by applying a paste to both end surfaces and then baked. The internal electrodes are formed by introducing a molten metal material into the void layers through the injection openings. The second set of external electrodes are formed by applying Ni or an alloy thereof onto the first set of electrodes, thus producing a multi-layer ceramic capacitor.

In accordance with another aspect, the present invention provides a method for manufacturing a multi-layer ceramic capacitor in which the dielectric body layers is formed by stacking a plurality of dielectric sheets. The void layers with injection openings in which the internal electrodes are to be formed are produced by applying a carbon combustible paste on each of the dielectric sheets prior to being stacked together. The stacked dielectric sheets are then sintered to produce a dielectric body with injection openings at both end surfaces which are in communication with the void layers.

The electrodes of the multi-layer ceramic capacitor are formed in the following manner. The first set of external electrodes are formed by applying silver or platinum/silver paste to both end surfaces and then baked. The second set of external electrodes are formed by applying Ni or an alloy thereof onto the first set of electrodes by plating, vapor deposition or paste baking procedure. The internal electrodes are formed by introducing a molten metal material into the void layers through the injection openings. Thus a multi-layer ceramic capacitor is produced.

These and other objects, features and advantages of the invention will become more apparent upon a reading of the following detailed specification and drawings.

BRIEF DESCRIPTION OF THE DRAWINGS

FIGS. 2A to 2E show steps of manufacturing process of multi-layer ceramic capacitor by a method according to a embodiment of the present invention, respectively, in which:

FIG. 2A shows ceramic dielectric sheets on each of which carbon paste is printed;

FIG. 2B is an elevational view of a ceramic dielectric body in which the ceramic sheets are fired and sintered;

FIG. 2C is a longitudinal sectional view of FIG. 2B;

FIG. 2D is a sectional view of a ceramic dielectric body on which first external electrodes are applied; and FIG. 2E is a sectional view of a ceramic dielectric body in which molten metal for forming internal electrodes is introduced.

DETAILED DESCRIPTION OF THE INVENTION

A method for manufacturing multi-layer ceramic capacitors according to the present invention will now be described by referring to FIGS. 2A through 2E in the accompanying drawings.

Figure 1:
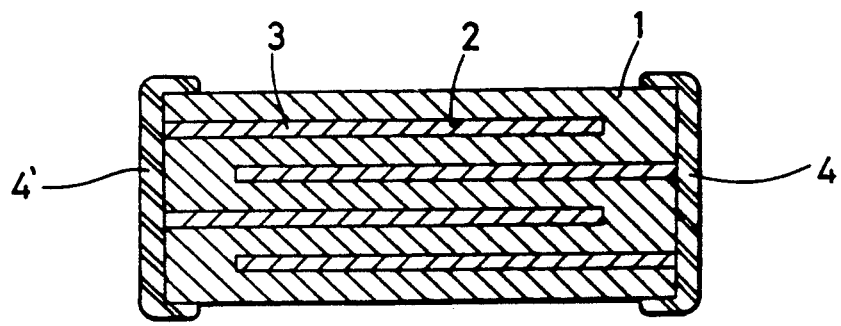
FIG. 1 is a sectional view of a multi-layer ceramic capacitor manufactured by a prior method for manufacturing multi-layer ceramic capacitor.
Figure 2A:
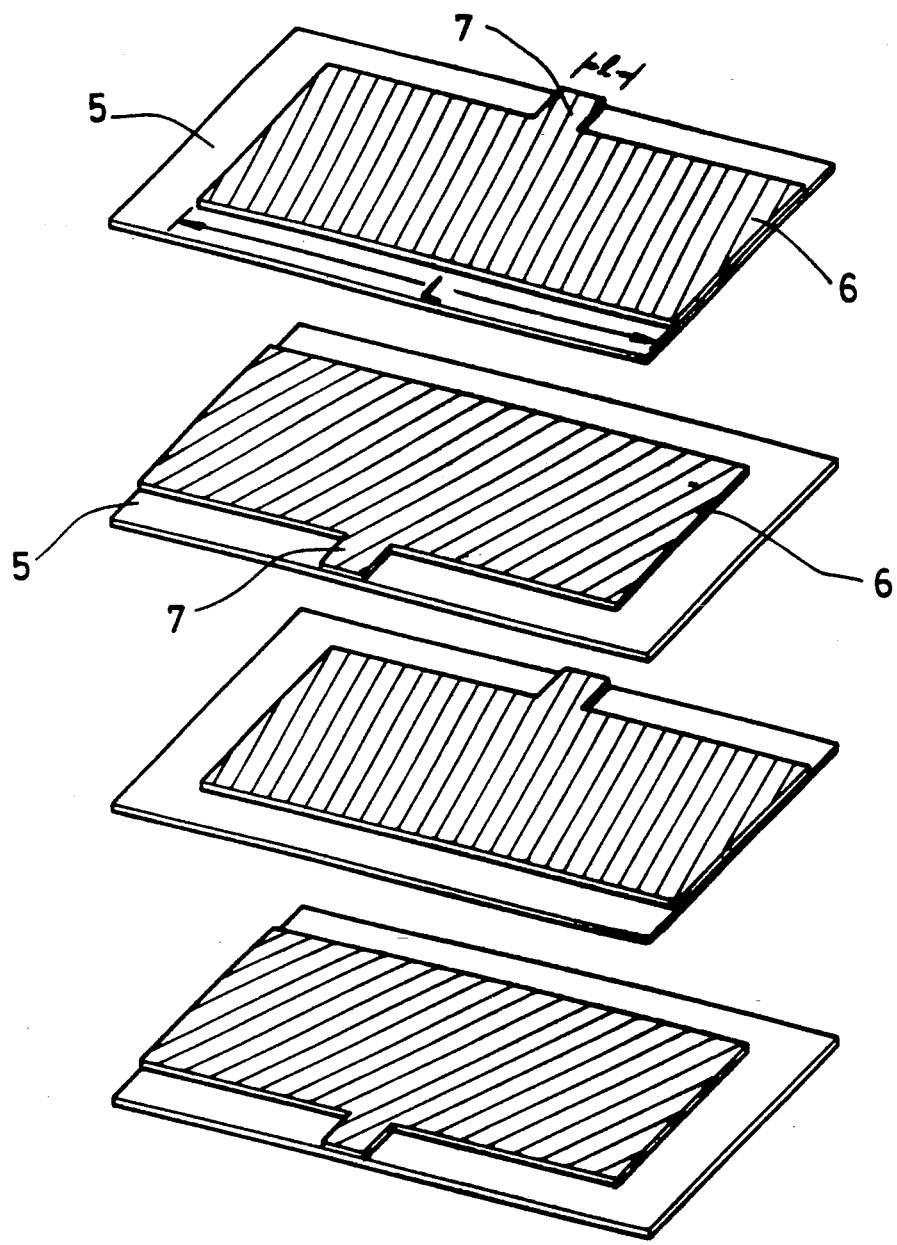

As shown in FIG. 2A, the ceramic body of the capacitor is formed by stacking together a plurality of dielectric sheets 5, each having a thickness of 20-100 μm. The void layers in the dielectric body are formed by applying a carbon paste 6 onto each of the dielectric sheets by a screen printing or a painting procedure (See FIGS. 2B to 2C). The carbon paste used to form the void layers consist of carbon powder and 5-50 wt. % alumina or barium titanate ($BaTiO^3$) mixed with organic solvent and resin.

Furthermore, only one end edge of the carbon paste 6 is applied up to the end portion of the dielectric sheet 5 while the other three edges are positioned within the interior of the dielectric sheet 5. Also, a portion of the carbon paste 6 is extended to one of the side edges of the ceramic sheets 5 to form projection 7, where the injection opening is to be formed. The length 1 of projection 7 is preferred to be 1/100-1/10 of the length L of the carbon paste 6.

The dielectric sheets 5 with the paste 6 are then stacked one-by-one so that the exposed edge portion of the paste 6 are positioned alternately in the dielectric layers. In addition, the carbon paste faces upwardly and the projections 7 of the adjacent carbon sheets 6 are positioned in opposite directions of each other.

Figure 2B:
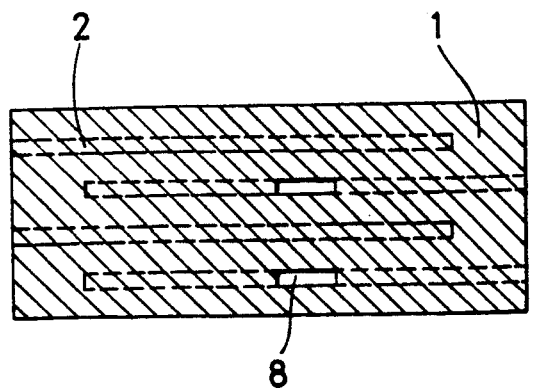
Figure 2C:
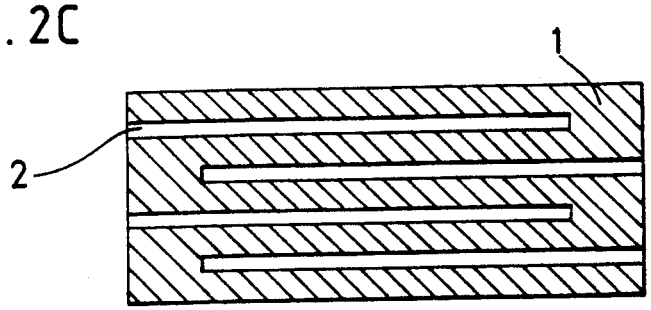

FIGS. 2B and 2C represent a ceramic dielectric body in which the ceramic sheets are fired and sintered. After the ceramic dielectric body 1, as mentioned above, is heated to a temperature of 500° C. or less, it is then fired to burn and remove the organic material in the carbon paste 6. The result of which is the formation of void layers 2 with injection openings 8 in the ceramic dielectric body 1

Next, the fired ceramic dielectric body 1 is sintered at a sintering temperature of 1100°-1400° C. so that fine ceramic crystal grains are formed on the ceramic dielectric body 1, thereby giving it excellent electrical property.

Figure 2D:
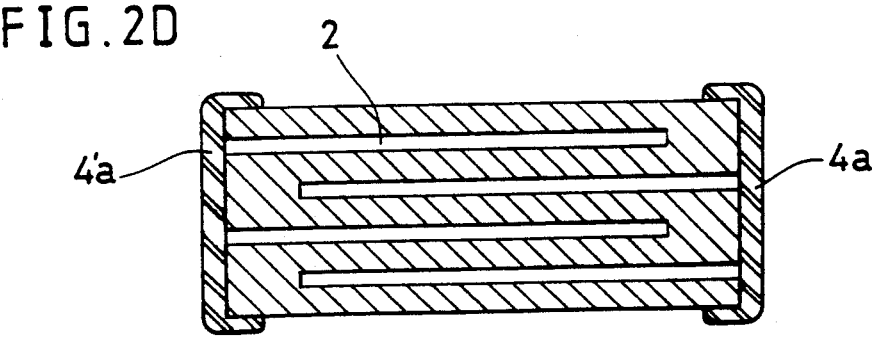

FIG. 2D shows a ceramic dielectric body on which the first external electrodes are applied. After the ceramic dielectric body 1 is sintered, a paste made of silver, platinum/silver or the like is then applied onto both end surfaces. After which, the ceramic body is baked, thus, forming the first external electrodes $4a$ and $4a'$ which serve as a part of external electrodes.

Figure 2E:
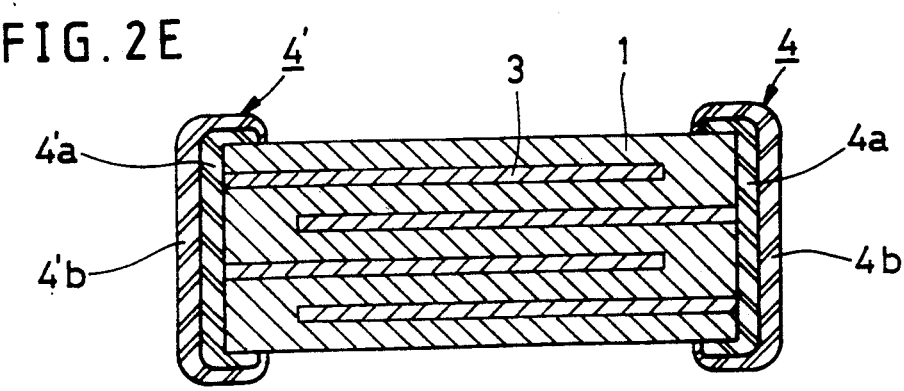

FIG. 2E, represents a ceramic dielectric body in which molten metal for forming internal electrodes is introduce. The ceramic dielectric body 1 on which the first external electrodes $4a$ and $4a'$ have been applied is dipped into a bath containing molten Pb or an alloy thereof, or Sn or an alloy thereof so that the molten metal is introduced into the void layers 2 through the injection openings 8. As the molten metal completely occupies the void layers 2, it becomes coupled to the inner surfaces of the first external electrodes $4a$ and $4a'$.

After the void layers 2 have been filled with the molten metal as mentioned above, Ni or an alloy thereof is coupled to the first external electrodes $4a$ and $4a'$ to form the second set of electrodes. Ni or an alloy thereof is used because it can easily be soldered. Further, Ni or an alloy thereof are not easily subject to oxidation. The second set of electrodes $4b$ and $4b'$ is formed on the first set of electrodes by either applying a paste, metal vapor deposition, electro-plating or electroless plating procedure. Therefore, with a series of procedures described above, a multi-layer ceramic capacitor according to the present invention is finished.

The present invention described hereinbefore relates to the preferred embodiment of the method for manufacturing multi-layer ceramic capacitors. Although in the above-described method, the second external electrodes of layers of Ni or an alloy thereof are formed onto the first external electrodes only after the molten metal for forming the internal electrodes has been injected into the void layers, it should also be understood that the present invention can be carried out such that the second external electrodes of Ni or an alloy thereof are formed before the molten metal is introduced into the void layers through the injection openings to form the internal electrodes.

As apparent from the above description, the multi-layer ceramic capacitor manufactured according to the present invention has injection openings through which molten metal is injected into the void openings to form the internal electrodes. By having injection openings, both the injection time and injection pressure of the molten metal bath are substantially decreased.

To exemplify this, an experiment comparing the electrostatic capacitance of a prior art capacitor having porous penetrable barriers instead of injection openings with one which is made according to the present invention. Two different tests were conducted. In the first test, both capacitors were dipped in a molten lead bath for one minute with an injection pressure of 0.5 MPa, while in the second test, an injection pressure of 1.5 MPa was used. The measured electrostatic capacitance of both capacitors are given in Table 1.

TABLE 1

| Injection Pressure (MPa) | Electrostatic Capacitance (nF) | |
| --- | --- | --- |
|  | Present Invention | Prior Art |
| 0.5 | 45.0 | 4.5 |
| 1.5 | 45.0 | 45.0 |

As apparent from Table 1, the electrostatic capacitance of a ceramic capacitor with its void layers completely filled with molten metallic material is 45.0 nF. Thus, a multi-layer ceramic capacitor with metal porous penetrable barriers requires an injection pressure of 1.5 MPa to completely fill the void layers with the molten metallic material. On the other hand, only an injection pressure of 0.5 MPa is required to completely fill the void layers of a multi-layer ceramic capacitor made according to the invention. Also, the experiment shows that if an injection pressure of 0.5 MPa was used, it would require at least 50 minutes to completely introduce the molten metal into the void layers of a prior art multi-layer ceramic capacitor.

Therefore, it is appreciated that the injection time and injection pressure required under the present invention is substantially less compared to that of a prior art ceramic dielectric body having porous penetrable barriers.

In addition, the present invention has an another advantage. The connections between the molten metal and the first external electrodes (or external electrodes) are entirely maintained after solidification of the molten metal. This is due to the fact the first external electrodes had been formed prior to the introduction of the molten metals. Thus, the subsequent introduction of the molten metal into the void layers creates a perfect connection to the inner surfaces of the first external electrodes.

Also, there is an advantage of this invention if the second electrode are applied by electro-plating, electroless plating or vapor deposition procedure. The advantage is that it is possible to select the proper metal for forming the internal electrodes regardless of the baking temperature of external electrodes due to the fact that the molten metal for internal electrodes is introduced after the external electrodes are baked.

However, if the metal selected for the internal electrodes has a lower melting point which is lower than the temperature for soldering or mounting the multi-layer ceramic capacitor manufactured by the method according to the invention on circuit boards, then the internal electrodes will be melted and will leak outwardly through the injection openings when the multi-layer ceramic capacitor is used in practice. Therefore, it is preferable to select metals for forming internal electrodes which have a melting point greater than the temperature for soldering or mounting the capacitor on circuit boards. Typically, this means metals having a melting point greater than 250° C. These metals include Pb or an alloy thereof, or Sn alloy, such as Sn-Cu.

Although the preferred embodiments of the invention have been disclosed for illustrative purpose, those skilled in the art will appreciate that various modifications, additions and substitutions are possible without departing from the scope and spirit of the invention as disclosed in the accompanying claims.

What is claimed is:

1. A method for manufacturing a multi-layer ceramic capacitor by introducing a molten metal material into void layers formed by stacking and sintering a plurality of ceramic dielectric sheets applied with a combustible carbon paste so as to form internal electrodes in a stacked ceramic dielectric body, said method comprising the steps of:
   forming injection openings which are in communication with the void layers and opening at side surfaces of the ceramic dielectric body prepared by stacking the ceramic dielectric sheets;
   applying paste for forming first external electrodes to both end surfaces of the ceramic dielectric body and baking the ceramic dielectric body to which the paste is applied;
   introducing molten metal material for forming internal electrodes into the void layers through the injection openings; and
   forming metal layers having Ni for forming second external electrodes on the said first external electrodes.

2. A method for manufacturing a multi-layer ceramic capacitor according to claim 1, wherein said molten metal material for forming the internal electrodes comprises a metal from the group consisting of Pb or alloy thereof or Sn alloy.

3. A method for manufacturing a multi-layer ceramic capacitor by introducing a molten metal material into void layers formed by stacking and sintering a plurality of ceramic dielectric sheets applied with a combustible carbon paste so as to form internal electrodes in a stacked ceramic dielectric body, said method comprising the steps of:
   forming injection openings which are in communication with the void layers and opening at side surfaces of the ceramic dielectric body prepared by stacking the ceramic dielectric sheets;
   applying paste of silver or platinum/silver for forming first external electrodes on both end surfaces of the ceramic dielectric body and baking the ceramic dielectric body to which the paste is applied;
   forming metal layers having Ni for forming second external electrodes on the first external electrodes by plating, vapor deposition or paste baking procedure; and
   introducing molten metal material for forming internal electrodes into the void layers through the injection openings.

4. A method for manufacturing a multi-layer ceramic capacitor according to claim 3, wherein said molten metal material for forming the internal electrodes comprising a metal from the group consisting of Pb or alloy thereof or Sn alloy.

* * * * *